United States Patent [19]

Geist et al.

[11] Patent Number: 4,477,642

[45] Date of Patent: Oct. 16, 1984

[54] SELFCROSSLINKING HEAT-HARDENABLE BINDER

[75] Inventors: Michael Geist, Münster; Horst Diefenbach, Nottuln, both of Fed. Rep. of Germany

[73] Assignee: BASF Farben & Fasern AG, Hamburg, Fed. Rep. of Germany

[21] Appl. No.: 526,071

[22] Filed: Aug. 24, 1983

[30] Foreign Application Priority Data

Sep. 7, 1982 [DE] Fed. Rep. of Germany ....... 3233140

[51] Int. Cl.³ .............................................. C08G 18/34
[52] U.S. Cl. ................................. 528/61; 204/181 R; 204/181 C; 428/418; 428/425.8; 525/127; 525/424; 525/438; 525/440; 525/450; 525/454; 525/528; 525/533; 528/45; 528/48; 528/110; 528/111; 528/113; 528/114; 528/341; 528/403; 528/408

[58] Field of Search .................. 528/408, 403, 48, 341, 528/113, 114, 111, 110, 45–61; 525/438, 424, 127, 440, 450, 454, 528, 533; 204/181 R, 181 C; 428/418, 425.8

[56] References Cited

U.S. PATENT DOCUMENTS 4,373,072  2/1983  Patzschke et al. ................. 525/528

*Primary Examiner*—Maurice J. Welsh
*Attorney, Agent, or Firm*—Wells & Wells

[57] ABSTRACT

The invention relates to a selfcrosslinking heat-hardenable binder, in particular for electropaints, which is based on an organic synthetic resin which contains hydroxyl groups and esterified carboxyl groups in the form of carbalkoxymethyl ester groups and is water-dilutable by partial or complete acid-neutralization of amino groups present in the resin.

16 Claims, No Drawings

SELFCROSSLINKING HEAT-HARDENABLE BINDER

The invention relates to a selfcrosslinking heat-hardenable binder, in particular for electropaints, which is based on an organic synthetic resin which contains hydroxyl groups and esterified carboxyl groups and which is water-dilutable by partial or complete neutralization with acids of amino groups present in the resin.

German Offenlegungsschrift No. 2,936,411 discloses a coating agent which contains a synthetic resin which contains primary and/or secondary and, if appropriate, also tertiary amino groups and terminally esterified carboxyl groups, which ester groups are largely stable in a neutral aqueous medium, but which are reactive toward the primary and/or secondary amino groups of the synthetic resin at elevated temperatures in a basic medium. According to the Example of German Offenlegungsschrift No. 2,936,411, baking takes place at 180° C. in the course of 25 minutes.

Only monoalcohols which contain 1 to 18, preferably 1 to 6, carbon atoms in the molecule are used as the alcohol component of the carboxylate groups in this known synthetic resin. It is particularly preferred to use alcohols which have a low boiling point, namely a boiling point below 140° C. The reactivity of the esters is increased by raising the electrophilic activity of the carboxyl group. The incorporation of methyl, ethyl and/or propyl esters of lactic acid or of dimethylolpropionic acid is referred to as particularly suitable. The use of monoalcohols as esterification component has the disadvantage that the resulting carboxylate groups are not sufficiently reactive despite their activation in the carboxylic acid component.

European Pat. No. 12,463 describes binders which crosslink with the aid of outside crosslinking agents or selfcrosslink (precondensates), via the transesterification of $\beta$-hydroxyalkyl esters. The reaction is speeded up by the catalysis of heavy metal salts.

It is the object of the invention to provide heat-hardenable binders which have increased reactivity in terms of the crosslinking in the course of baking. As a result it should be possible to obtain, on the one hand, favorable baking conditions and, on the other, effective crosslinking.

It has now been found, surprisingly, that binders having improved properties in terms of their preparation, the quality of the resulting coatings and in particular the baking conditions are obtained when the carboxylate groups they contain have been activated in the alcohol component by a substituent which exerts a negative inductive effect.

The invention thus relates to a binder which contains hydroxyl groups and esterified carboxyl groups and is of the type mentioned in the introduction and wherein the esterified carboxyl groups are carbalkoxymethyl ester groups.

The binders of the invention offer the following advantages: the alcohol components used, ie. the hydroxyacetates, are particularly favorable leaving groups and thus effectively activate the carboxylate groups. This in turn leads to effective crosslinking in the ultimately resulting film.

The carboxylate groups of the invention, which are activated in the alcohol component, can moreover be prepared by advantageous methods involving reactions which can be carried out under mild conditions. There are consequently no side reactions, such as, for example, transesterifications, and a relatively uniform product is formed. A further advantage of the binders of the invention is that the compounds released in the course of baking, namely the hydroxyacetates, are particularly good flow-control agents which give the coatings a particularly good surface finish. For example, ethyl hydroxyacetate as such is already known for use as a flow-control agent, and the invention makes it possible to liberate this compound in the course of baking and thereby achieve a particularly good effect. In contrast, the liberation of low-boiling alcohols brings with it the danger of so-called boilers and other film defects in the coating.

The synthetic resin of the invention is used particularly preferably as a binder for electropaints to be deposited at the cathode. When used as a binder, it can advantageously also be deposited in combination with a finely divided, solid resin by the EPC (electro powder coating) process. However, the synthetic resin is also suitable for use as a binder for conventional, solvent-containing baking finishes and for powder finishes.

It will be obvious to those skilled in the art that the resulting coating agents can also contain pigments, fillers, crosslinking catalysts, corrosion inhibitors and further known paint assistants.

In the course of baking, then, the carbalkoxymethyl ester groups react with the hydroxyl groups by eliminating hydroxyacetates to form new ester bonds. The crosslinking mechanism can be described in principle by the following reaction equation:

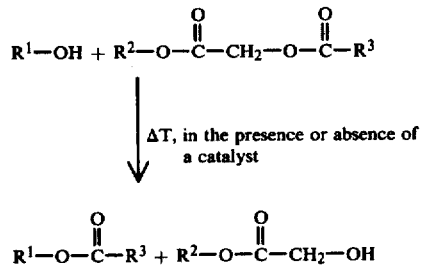

$R^1$ and $R^3$ = binder molecule, $R^2$ = alkyl.

The eliminated hydroxyacetates preferably have a boiling point close to the baking temperature, so that they act, in the course of baking, as particularly effective flow-control agents.

This crosslinking mechanism has the effect of making the paint film very resistant to solvents, alkalis and salt mists. The films form very resistant coatings, even without corrosion inhibitors, even on unpretreated iron sheet.

The synthetic resin preferably contains 1 to 5 hydroxyl groups and 1 to 5 activated ester groups per 1,000 molecular weight units.

The equivalence ratio between the hydroxyl groups and the carbalkoxymethyl ester groups is advantageously 2:1 to 1:2, an equivalence ratio of about 1:1 being particularly preferred.

The binder is thus an organic synthetic resin which contains hydroxyl groups and carbalkoxymethyl ester groups as reactive groups.

To make the binder dilutable in water, it contains amino groups which have been partially or completely neutralized. The dilutability of water can also be obtained by incorporating ammonium salts.

Resins which are particularly suitable for preparing the selfcrosslinking heat-hardenable binders of the invention contain epoxide groups, preferably terminal epoxide groups, and belong to the group consisting of polyglycidyl ethers, polyglycidyl esters and polyglycidylamines. The synthetic resin has accordingly been advantageously prepared by reacting a polyglycidyl ester or ether with a compound which bears carbalkoxymethyl esters and groups which are reactive toward epoxide groups.

For the purposes of this invention, polyglycidyl ethers are preferably those polyglycidyl ethers of the general formula

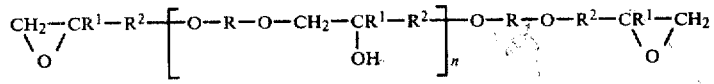

where

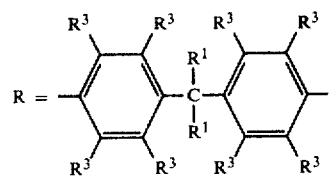

$R^1 =$ H or $C_nH_{2n+1}$, $R^2 = (CR^1_2)n$, $R^3 = R^1$, halogen and, preferably, H, n=0 to 5.

The epoxy resins can also be used in the hydrogenated or partially hydrogenated state. To control the properties of the film, some, or all, of the reactive groups of the epoxy resin can be reacted with other compounds. There are several possible compounds for this purpose, including:

(a) carboxyl-containing compounds, such as saturated or unsaturated monocarboxylic acids (for example benzoic acid, linoleic acid, 2-ethylhexanoic acid or Versatic acid), aliphatic, cycloaliphatic and/or aromatic dicarboxylic acids of different chain lengths (for example adipic acid, sebacic acid, isophthalic acid or dimeric fatty acids), hydroxyalkylcarboxylic acids (for example lactic acid or dimethylolpropionic acid) and carboxyl-containing polyesters or (b) amino-containing compounds, such as diethylamine or ethylhexylamine or diamines having secondary amino groups, such as, for example, N,N'-dialkylalkylenediamine, such as dimethylethylenediamine, N,N'-dialkylpolyoxyalkyleneamine, such as N,N'-dimethylpolyoxypropylenediamine, polyaminoamides, such as Versamide, or the reaction product of one mole of diaminohexane with two moles of monoglycidyl ether or monoglycidyl ester, especially glycidyl esters of α-branched fatty acids, such as Versatic acid, or (c) hydroxyl-containing compounds, such as neopentylglycol, bisethoxylated neopentylglycol, neopentylglycol hydroxypivalate, dimethylhydantoin-N,N'-diethanol, hexane-1,6-diol, hexane-2,5-diol, but-2-ene-1,4-diol, but-2-yne-1,4-diol, hex-3-yne-2,5-diol or other alkynediols, 1,4-bis-(hydroxymethyl)-cyclohexane, trimethylolpropane, pentaerythritol or amino alcohols, such as triethanolamine, methyldiethanolamine or hydroxyl-containing alkylketimines, such as aminomethylpropane-1,3-diol methyl isobutyl ketimine or tris-(hydroxymethyl)-aminomethanecyclohexanone ketimine and also polyglycol ethers, polyester polyols, polyetherpolyols or polycaprolactonepolyols of various degrees of functionality and molecular weights.

Suitable for use as polyglycidyl esters are reaction products of bisglycidyl terephthalate or bisglycidyl isophthalate with the component bearing the activated ester group.

To control the properties of the film, some of the reactive glycidyl groups remaining can be reacted with other compounds. Compounds suitable for this purpose include those mentioned above under a, b and c.

For the purposes of the invention, polyglycidylamines are those glycidyl-containing resins which are obtained by introducing glycidyl groups into NH2-functional resins, for example via epichlorohydrin.

In another advantageous embodiment of the invention, the synthetic resin is a polyurethane resin which has been obtained by reacting a diisocyanate with a compound which bears groups which are reactive toward isocyanate groups and at least one carbalkoxymethyl ester group to give an intermediate product having terminal isocyanate groups and reacting these isocyanate groups with a primary or secondary amine, a ketimine or aldimine which has a hydrogen atom at the nitrogen atom or with an amino alcohol blocked at the nitrogen atom.

Also suitable are copolymers of acrylates and/or methacrylates which contain, for example, glycidyl acrylate and/or methacrylate or any other olefinically unsaturated, polymerizable compound bearing a glycidyl group, and carbalkoxymethyl acrylate and/or carbalkoxymethyl methacrylate. In a further reaction step, the glycidyl groups can be modified with the compound bearing the amino groups.

However, it is also possible to use suitable amino-containing monomers in the monomer mixture to be polymerized.

The copolymers preferably have a number average molecular weight of 700 to 15,000. Preferred monomers are acrylates and methacrylates having 1 to 8 carbon atoms in the alcohol radical. However, the copolymers can also contain further monomers, suich as (meth)acrylamide, styrene, vinyltoluene or vinylcarbazole. The copolymer is prepared in a well-known manner by solution, suspension or emulsion polymerization in the presence of such initiators as peroxides, hydroperoxides, peresters or thermolabile azo compounds, and, if appropriate, molecular weight regulators.

The amino groups are preferably introduced into the organic resin by reacting a polyamide and/or an amino- and/or hydroxyl-containing ketimine with resins which contain at least one, preferably at least two, epoxide groups or isocyanate groups, or any other suitably reactive group, per molecule. However, a binder containing amino groups can also be obtained by other addition reactions, for example by esterifying or amidating compounds bearing primary and/or secondary amino groups with resins containing groups suitable for this purpose.

The amino groups are particularly suitably introduced by means of polyamines and/or amino- and/or hydroxyl-containing ketimines. If the addition reaction is carried out with the compounds bearing primary or secondary amino groups in the form of their ketimines, the reaction conditions should be controlled in such a way as to leave no ketimine-decomposing substances in the reaction product.

Compounds particularly suitable for introducing the activated ester groups into the binder have one or more carboxylic acid groups in addition to further reactive groups which make possible the incorporation into the binder. Before or after the incorporation into the binder, the carboxylic acid group can be converted into the desired carbalkoxymethyl ester group. Examples of compounds which have these reaction possibilities are dihydroxymonocarboxylic acids, such as 2,2-bis-(hydroxymethyl)-propionic acid, 4,4-(4,4'-bis-hydroxyphenyl)-valeric acid or 3,5-dihydroxybenzoic acid, dihydroxydicarboxylic acids, such as tartaric acid or 1,1-methylene-bis-(2-hydroxy-3-naphthoic acid) and aminocarboxylic acids, such as 11-aminoundecanoic acid, 3-aminopropionic acid or 4-aminobenzoic acid.

These compounds containing the activated ester group can be reacted via their reactive groups, in particular via hydroxyl or amino groups, with reactive groups in the resin binder. For this purpose the resin binder preferably has epoxide or isocyanate groups. The reactive groups can have been incorporated in the binder in the terminal position or along the molecule chain.

The electrocoating method requires that on protonation with acid the binder mixture is in the form of an aqueous solution or dispersion.

The solubility in water of the binder is brought about by neutralizing with acids the amino groups they contain. Suitable acids are in particular organic acids, but it is also possible to use, for example, hydrochloric acid or phosphoric acid. The amino groups are preferably neutralized with formic acid, acetic acid, malonic acid, lactic acid or citric acid.

Said acids can also be used if the solubilizing groups are introduced by adduct formation of an ammonium group with the binder.

The degree of neutralization of the solubilizing groups is, based on these groups, between 0.2 and 1.0 equivalent and preferably between 0.25 and 0.6 equivalent of acid.

The neutralization can be carried out in the following ways. The acid is introduced into water, if appropriate together with dispersants, and the resin solution is stirred into the water at room temperature or, if appropriate, at elevated temperatures. However, the acid can also be added directly to the resin solution. The neutralized resin solution can then be stirred into the water, or, if appropriate, the water can be slowly incorporated into the resin solution.

The dispersion, to control its viscosity, the deposition voltage and the flow, can contain up to 20% of organic solvents. If, as a result of the method of preparation chosen, the batch contains too much solvent or even solvent which has an adverse effect on the properties, the solvents can be distilled out of the resin solution before the dispersing, or they are distilled out of the aqueous dispersion. It is advantageous for the sum total of all properties if the organic solvent content is as low as possible.

The solids content of a deposition bath which has been made up with the binders of the invention is 7 to 35 parts by weight, preferably 12 to 25 parts by weight. The pH of the deposition bath is between 4 and 8, preferably between 5 and 7.5. The anodes used in the deposition bath are non-corroding steel anodes or graphite anodes. The temperature of the made-up bath should be between 15° and 35° C., preferably between 20° and 30° C. The length of deposition and the deposition voltage are chosen to be such that the desired film thickness is obtained.

After the deposition process the coated article is rinsed off and is then ready for baking.

Irrespective of how the coating agents prepared from the binder of the invention have been applied, the paint film is crosslinked in the course of baking at temperatures of 130° to 200° C. for 10 to 60 minutes, preferably 150° to 180° C. for 15 to 30 minutes.

The esterification reaction can be further accelerated by means of suitable catalysts. Suitable for this purpose are, in particular, ammonium compounds, such as benzyltrimethylammonium hydroxide, benzyltrimethylammonium chloride, trimethylcetylammonium bromide or tetraammonium iodide and organic tin compounds, such as dibutyltin dilaurate, and iron(III) acetylacetonate, zinc acetate, zinc 2-ethylhexoate, cobalt naphthenate, lead acetate, lead octoate or butyl titanate.

Pigmenting is effected in a well-known manner, namely by milling the pigments and the customary additives, such as fillers, corrosion inhibitors and antifoams, in the binder. Examples of milling units which can be used are sand mills, ball mills and three-roll mills. The paint can be finished off by generally known methods.

The invention also relates to a process for preparing a binder, in particular for electropaints, which comprises reacting a polyglycidyl ester or ether with a compound which bears groups which are reactive toward epoxide groups and at least one carbalkoxymethyl ester group.

The invention also relates to a process for preparing a binder, in particular for electropaints, which comprises reacting a diisocyanate with a compound which bears groups which are reactive toward isocyanate groups and at least one carbalkoxymethyl ester group.

The invention further relates to the use of the binders for preparing electrocoating baths for the electrocoating process.

The invention also relates to a process for preparing coatings by dipping an electrically conductive substrate into an aqueous electrocoating bath which contains an at least partially acid-neutralized binder based on an organic synthetic resin containing hydroxyl groups and esterified carboxyl groups and connecting therein as the cathode, depositing a film on the substrate by direct current, removing the substrate from the bath and baking the film to harden it into a coating, wherein the esterified carboxyl groups of the synthetic resin are carbalkoxymethyl ester groups and are reacted, in the course of baking, with the hydroxyl groups of the binder to form ester groups.

The invention finally also relates to a coated substrate which has been prepared by the process described.

Below, the invention will be illustrated in more detail by means of examples.

PRECURSOR 1

Preparation of carbomethoxymethyl 2,2-bis-(hydroxymethyl)-propionate

A 5-liter reaction vessel which has been equipped with a stirrer, an internal thermometer, a reflux condenser and a 1-liter dropping funnel is charged with 550 g of 2,2-bis-(hydroxymethyl)-propionic acid and 2,460 g of cyclohexanone, and the mixture is heated to 100° C. When the bulk of the dihydroxycarboxylic acid has gone into solution, the temperature is lowered to 60° C., and 414 g of triethylamine are added dropwise. The temperature is held at 60° C. by cooling. The resulting triethylammonium 2,2-bis-(hydroxymethyl)-propionate stays in solution. 7 g of potassium iodide are then added, followed, in dropwise fashion, by 565 g of methyl chloroacetate in the course of 30 minutes. The batch is held at this temperature for a further 4 hours, is then allowed to cool down to room temperature and is filtered to remove the triethylammonium chloride formed. The filtrate is concentrated in a rotary evaporator and is then adjusted with xylene to a solids content of 90%.

PRECURSOR 2

Preparation of carbethoxymethyl 4,4-(4,4'-dihydroxydiphenyl)pentanoate

A 4-liter reaction vessel is charged with 1,144 parts of 4,4-(4,4'-dihydroxydiphenyl)pentanoic acid and 1,716 parts of methyl isobutyl ketone. When the acid has dissolved, 404 parts of triethylamine are added dropwise. In the course of the addition the temperature rises. When the dropwise addition is complete, the mixture is allowed to react at 50° C. for a further one hour. It is then cooled down to room temperature, and the ammonium salt formed is then separated off.

1,500 parts of the ammonium salt are dissolved in 1,500 parts of butylglycol. 2.5 parts of potassium iodide are added, followed at 40° C., in dropwise fashion, by 370 parts of ethyl chloroacetate. When the dropwise addition is complete, the temperature is raised to 60° C., and the batch is allowed to react for a further 5 hours. It is then cooled down to room temperature, and the triethylammonium chloride is separated off. The filtrate is concentrated in vacuo. Thereafter 310 parts of Solvesso 150 (an aromatic mixture from Esso AG, boiling range 187°-207° C.) are added, and 155 parts thereof are distilled off in vacuo to displace the butylglycol completely. The solids content is adjusted to 90%.

EXAMPLE 1

Preparation of a binder dispersion

A 4-liter reaction vessel is charged with 1,410 parts of a commercially available epoxy resin based on bisphenol A (epoxide equivalent weight 188), 690 parts of precursor 1 and 38 parts of xylene. The mixture is heated to 83° C. 9 parts of dimethylbenzylamine are then added. An exothermic reaction sets in. The temperature is maintained at 95° C. by cooling. The temperature increases in the course of 7 hours to 110° C. When an epoxide equivalent weight of 1,280 has been reached, 158 parts of diethanolamine are added and the reaction temperature is allowed to rise to 115° C. An hour later, 142 parts of hexylglycol and 44 parts of lead octoate are added and mixed in.

In the meantime a dispersing bath is prepared from 1,604 parts of deionized water, 37 parts of an emulsifier solution and 27 parts of glacial acetic acid. 2,100 parts of the resin solution are dispersed therein. After an hour a further 2,468 parts of deionized water are added. The water is mixed in for half an hour. The dispersion is then filtered. The solids content of the dispersion is 37.2%.

EXAMPLE 2

Preparation of a binder dispersion

The synthesis of Example 1 is repeated, except that precursor 2 is used in place of precursor 1.

Weights of components in resin synthesis (in parts)

Epoxy resin: 1,306
Precursor 2: 1,148
Xylene: 34
Dimethylbenzylamine: 6
Diethanolamine: 146
Hexylglycol: 161
Lead octoate: 50

Weights of components in the dispersing bath (in parts)

Resin: 2,100
Glacial acetic acid: 48
Emulsifier solution: 37
deionized water: 1,793
deionized water: 2,034
Solids content of the dispersion: 36.4%.

EXAMPLE 3

Preparation of a resin solution

A suitable 4-liter reactor is charged with 1,410 parts of a commercially available epoxy resin based on bisphenol A (epoxide equivalent weight 188) and 621 parts of precursor 1. 107 parts of xylene are added. The mixture is heated to 90° C. 7 parts of dimethylbenzylamine are then added, and the temperature is allowed to rise to 105° C. When the epoxide equivalent weight has reached 1,280, 486 parts of a dimethylethanolamine/lactic acid adduct (69% in a butylglycol/water mixture) are added at 80° C. This temperature is maintained for 6 hours and butylglycol is then added to adjust the solids content to 60%. The resin solution can be used as a triturating resin for preparing a pigment paste.

Preparation of a pigment paste

The resin solution described in Example 3 was used to prepare a gray pigment paste of the following formulation.

| | |
|---|---|
| Titanium dioxide | 1,998 parts |
| Aluminum silicate | 448 parts |
| Lead pigment | 118 parts |
| Carbon black | 32 parts |
| Bentones | 29 parts |
| Iron oxide pigment | 16 parts |
| deionized water | 2,480 parts |
| Resin solution | 1,716 parts |
| Butylglycol | 122 parts |

These components were mixed and ball-milled for 70 hours to a fineness of 6–8 μm.

Preparation of deposition baths

The dispersions of Examples 1 and 2 are made up with the pigment paste described above into electrocoating baths.

|  | Example A on the basis of dispersion 1 | Example B on the basis of dispersion 2 |
| --- | --- | --- |
| Deionized water | 2,000 parts | 2,000 parts |
| 10% strength acetic acid | 25 parts | 25 parts |
| Dispersion | 1,838 parts | 1,879 parts |
| Pigment paste | 775 parts | 775 parts |
| Deionized water | 362 parts | 321 parts |

The baths are aged at room temperature for 3 days. Zinc-phosphatized steel sheets which are connected as the cathode are then coated in the paint baths. The deposition takes place at a bath temperature of 23° C. in the course of 2 minutes. The deposited films are hardened in a circulating-air oven at 185° C. in the course of 20 minutes.

|  | Example A | Example B |
| --- | --- | --- |
| Film thickness | 18.3 μm | 19.7 μm |
| Cratering[1] | 0 | 0-1 |
| Flow-control[1] | 1 | 1.5 |
| MIBK test[2] | no dissolving | no dissolving |
| Erichsen deep-drawing | 7.2 mm | 6.8 mm |

[1]Best value: 0; worst value: 5
[2]MIBK test: the dissolving or swelling of the film is evaluated after exposure to 20 double strokes with methyl isobutyl ketone.

What we claim is:

1. A selfcrosslinking heat-hardenable binder, in particular for electropaints, which is based on an organic synthetic resin which contains hydroxyl groups and esterified carboxyl groups and which is water-dilutable by partial or complete acid-neutralization of amino groups present in the resin, wherein the esterified carboxyl groups are carbalkoxymethyl ester groups.

2. A binder as claimed in claim 1, wherein the synthetic resin contains 1 to 5 hydroxyl groups and 1 to 5 carbalkoxymethyl ester groups per 1,000 molecular weight units.

3. A binder as claimed in claim 2, wherein the equivalence ratio between the hydroxyl groups and the carbalkoxymethyl ester groups is 2:1 to 1:2.

4. A binder as claimed in claim 3, wherein the synthetic resin is an epoxy resin which has been prepared by reacting a polyglycidyl ester or ether with a compound which bears 2 groups which are reactive toward epoxide groups and at least one carbalkoxymethyl ester group to give an intermediate product having terminal epoxide groups and reacting these epoxide groups, by ring-opening, with a primary or secondary amine, a ketimine or aldimine which has a hydrogen atom at the nitrogen or with an amino alcohol which is blocked at the nitrogen atom.

5. A binder as claimed in claim 4, wherein the synthetic resin is a polyurethane resin which has been prepared by reacting a diisocyanate with a compound which bears groups which are reactive toward isocyanate groups and at least one carbalkoxymethyl ester group to give an intermediate product having terminal isocyanate groups and reacting these isocyanate groups with a primary or secondary amine, a ketimine or aldimine which has a hydrogen atom at the nitrogen atom or with an amino alcohol which is blocked at the nitrogen atom.

6. A process for preparing a binder, in particular for electropaints, which comprises reacting a polyglycidyl ester or ether with a compound which bears groups which are reactive toward epoxide groups and at least one carbalkoxymethyl ester group.

7. A process for preparing a binder, in particular for electropaints, which comprises reacting a diisocyanate with a compound which bears groups which are reactive toward isocyanate groups and at least one carbalkoxymethyl ester group.

8. A process as claimed in claim 6, wherein the molar ratios of the starting materials used are chosen so as to produce a binder which has 1 to 5 hydroxyl groups and 1 to 5 carbalkoxymethyl ester groups per 1,000 molecular weight units.

9. A process as claimed in claim 8, wherein the molar ratios of the starting materials are chosen in such a way as to produce a binder which has an equivalence ratio between the hydroxyl groups and the carbalkoxymethyl ester groups of 2:1 to 1:2.

10. Use of a binder as claimed in claim 1, for preparing electrocoating baths for the electrocoating process.

11. A process for preparing coatings by dipping an electrically conductive substrate into an aqueous electrocoating bath which contains an at least partially acid-neutralized binder which contains hydroxyl groups, esterified carboxyl groups and amino and/or ammonium groups and is based on an organic synthetic resin, and connecting it therein as the cathode, depositing a film on the substrate by direct current, removing the substrate from the bath, and baking the film to harden it into a coating, wherein the esterified carboxyl groups of the organic synthetic resin are carbalkoxymethyl ester groups.

12. A process as claimed in claim 11, wherein the binder used is a synthetic resin which contains 1 to 5 hydroxyl groups and 1 to 5 carbalkoxymethyl ester groups per 1,000 molecular weight units.

13. A process as claimed in claim 12, wherein the binder used is a synthetic resin which has an equivalence ratio between the hydroxyl groups and the carbalkoxymethyl ester groups of 2:1 to 1:2.

14. A process as claimed in claim 13, wherein the binder used is a synthetic resin which has been prepared by reacting a polyglycidyl ester or ether with a compound which bears 2 groups which are reactive toward epoxide groups and at least one carbalkoxymethyl ester group to give an intermediate product having terminal epoxide groups and reacting these epoxide groups, by ring-opening, with a primary or secondary amine, a ketimine or aldimine which has a hydrogen atom at the nitrogen atom or with an amino alcohol which is blocked at the nitrogen atom.

15. A process as claimed in claim 13, wherein the binder used is a synthetic resin which has been prepared by reacting a diisocyanate with a compound which bears groups which are reactive toward isocyanate groups and at least one carbalkoxymethyl ester group to give an intermediate product having terminal isocyanate groups and reacting these isocyanate groups with a primary or secondary amine, a ketimine or aldimine which has a hydrogen atom at the nitrogen atom or with an amino alcohol which is blocked at the nitrogen atom.

16. A coated substrate prepared by a process as claimed in claim 11.

* * * * *